United States Patent
Sun et al.

(10) Patent No.: US 8,019,171 B2
(45) Date of Patent: Sep. 13, 2011

(54) VISION-BASED COMPRESSION

(75) Inventors: Xiaoyan Sun, Beijing (CN); Feng Wu, Beijing (CN); Shipeng Li, Redmond, WA (US); Dong Liu, Hefei (CN)

(73) Assignee: Microsoft Corporation, Redmond, WA (US)

( * ) Notice: Subject to any disclaimer, the term of this patent is extended or adjusted under 35 U.S.C. 154(b) by 1163 days.

(21) Appl. No.: 11/736,900

(22) Filed: Apr. 18, 2007

(65) Prior Publication Data

US 2007/0248272 A1    Oct. 25, 2007

Related U.S. Application Data

(60) Provisional application No. 60/745,169, filed on Apr. 19, 2006.

(51) Int. Cl.
*G06K 9/36* (2006.01)
(52) U.S. Cl. ....................................................... 382/243
(58) Field of Classification Search .......... 382/274–275, 382/199, 173–176, 282–283, 298–300, 254, 382/260, 1.9, 3.26–3.27, 426.16; 375/240.01–240.29; 345/606–610
See application file for complete search history.

(56) References Cited

U.S. PATENT DOCUMENTS

| | | | | |
|---|---|---|---|---|
| 5,172,227 A * | 12/1992 | Tsai et al. | ................... | 375/240.2 |
| 5,612,745 A | 3/1997 | Ozcelik et al. | | |
| 5,696,842 A * | 12/1997 | Shirasawa et al. | ............ | 382/176 |
| 5,760,846 A | 6/1998 | Lee | | |
| 5,805,221 A | 9/1998 | Lee | | |
| 6,058,211 A * | 5/2000 | Bormans et al. | ............... | 382/235 |
| 6,731,800 B1 * | 5/2004 | Barthel et al. | ................. | 382/176 |
| 7,009,579 B1 | 3/2006 | Kondo et al. | | |
| 7,305,148 B2 * | 12/2007 | Spampinato et al. | ......... | 382/299 |
| 7,840,086 B2 * | 11/2010 | Bertozzi et al. | ............... | 382/254 |
| 2003/0202713 A1 * | 10/2003 | Sowa | ............................ | 382/260 |
| 2004/0158719 A1 | 8/2004 | Lee et al. | | |

OTHER PUBLICATIONS

International Search Report and Written Opinion for PCT Application No. PCT/US2007/009702, mailed on Oct. 11, 2007, 7 pgs.

* cited by examiner

*Primary Examiner* — Sherali Ishrat
(74) *Attorney, Agent, or Firm* — Lee & Hayes PLLC

(57) ABSTRACT

Systems and methods provide vision-based image compression. In one implementation, inpainting is the vision-based technique selected to augment a conventional signal-processing-based technique. For some regions of a source image, an exemplary system efficiently extracts and organizes structural edge information instead of compressing the regions. In one implementation, the system applies binary curve fitting to capture the edge information. A structure-aware inpainter in the decoder can then restore the regions via the edge information, which occupies very little data space or minimal bandwidth in a bitstream that is transmitted from encoder to decoder. Key visual components of the image can still be conventionally compressed. Extracting edge information for some regions instead of compressing them considerably increases overall image compression.

18 Claims, 8 Drawing Sheets

VISION-BASED COMPRESSION

RELATED APPLICATIONS

This application claims priority to U.S. Provisional Patent Application No. 60/745,169 to Sun et al., filed Apr. 19, 2006 and entitled, "Vision-Based Compression," which is incorporated herein by reference in its entirety. This application is also related to U.S. patent application Ser. No. 11/558,755 to Sun et al., filed Nov. 10, 2006 and entitled, "Image Compression Based On Parameter-Assisted Inpainting," also incorporated herein by reference in its entirety.

BACKGROUND

Attempts have been made to develop image compression techniques by identifying and utilizing visual features within images to achieve higher coding efficiency. Moreover, an awareness of how the human visual system (HVS) perceives various image features has been incorporated into coding methods for removing some of the visual redundancy inherent in images and for improving the visual quality of resulting images. Nonetheless, the development of such coding schemes is greatly influenced by the effectiveness of edge detection and segmentation tools.

Meanwhile, great improvements have also been made in conventional signal-processing-based compression methods. Such mainstream coding schemes manage to make use of the statistical redundancy among pixels in the pursuit of high coding efficiency. State-of-the-art JPEG2000 and MPEG-4 AVC/H.264 are two such examples that greatly outperform previous generations in coding efficiency. However, perceptual quality is almost completely neglected during algorithm design. Additionally, in current development of such schemes, even small improvements come at a high cost of multiplying encoding complexity.

Image inpainting (also known as image completion) is a process of restoring missing data in a designated region of an image in a visually plausible manner. Current results show that inpainting can recover homogenous regions in a natural-looking manner, even when certain kinds of limited structure are present. However, conventional image inpainting is not effective at regenerating significant visual structure (e.g., structural edges), especially if they are unique or have special, exact placement in the image. These structural edges are conventionally relegated to conventional compression so that they will reliably reappear in the regenerated image.

Nonetheless, structural data, especially edges, have a perceptual significance that is greater than the numerical value of their energy contribution to the entire image. Thus, the coding efficiency and the video quality of image coding techniques could be improved if the structural information might be properly exploited. What is needed is way to efficiently capture and organize structural edge information extracted from a source image so that an inpainter in a decoder can restore relatively large structural regions of the image with guidance that occupies very little data space/minimal bitstream bandwidth to transmit from encoder to decoder.

SUMMARY

Systems and methods provide vision-based image compression. In one implementation, inpainting is the vision-based technique selected to augment a conventional signal-processing-based technique. For some regions of a source image, an exemplary system efficiently extracts and organizes structural edge information instead of compressing the regions. In one implementation, the system applies binary curve fitting to capture the edge information. A structure-aware inpainter in the decoder can then restore the regions via the edge information, which occupies very little data space or minimal bandwidth in a bitstream that is transmitted from encoder to decoder. Key visual components of the image can still be conventionally compressed. Extracting edge information for some regions instead of compressing them considerably increases overall image compression.

This summary is provided to introduce exemplary vision-based compression, which is further described below in the Detailed Description. This summary is not intended to identify essential features of the claimed subject matter, nor is it intended for use in determining the scope of the claimed subject matter.

DETAILED DESCRIPTION

Overview

Figure 1:
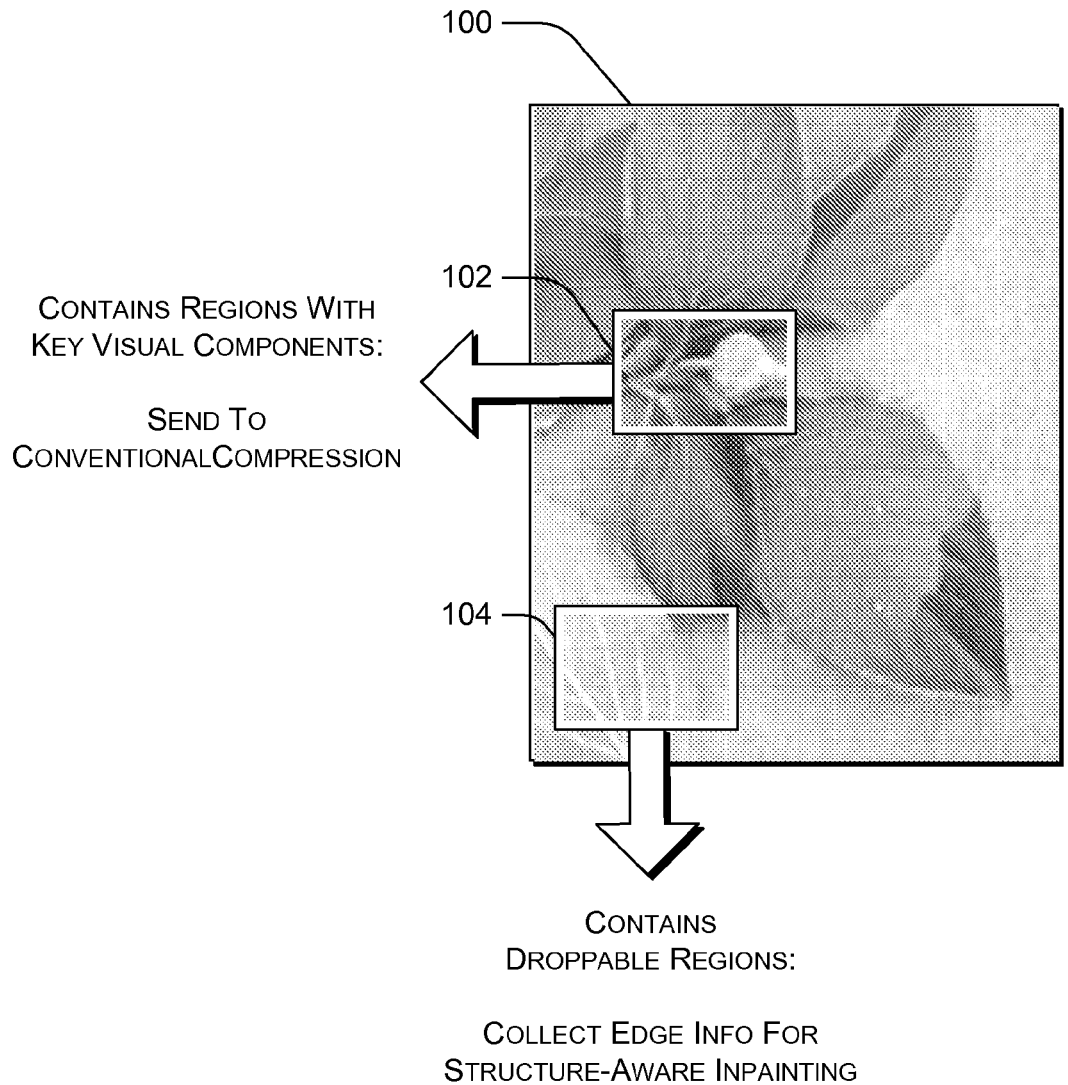
FIG. 1 is a diagram of an image separated into regions to be compressed and regions to be synthesized at a decoder.

Described herein are exemplary systems and methods for vision-based image compression, e.g., compression based on structure-aware inpainting. Such systems and methods significantly boost image (and video) compression and coding efficiency. As shown in FIG. 1, in a typical implementation, an image 100 is partitioned into blocks or "regions." Regions that contain key visual components, such as regions in area 102, are compressed by conventional signal-processing-based compression techniques. Remaining regions, which may still contain significant structure, such as those in area 104, are dropped from compression at the encoder being used. Instead of compression, the exemplary system extracts visual edge information from these remaining regions. In one implementation, the system applies binary curve fitting to represent the edges. This edge information has a small data size compared with compressed versions of the same regions. The edge information, in turn, may be compressed—i.e., instead of compressing the literal image content—to represent the dropped blocks.

At the decoder, the dropped regions are inpainted based on the edge information. In one implementation, the inpainter propagates structure in each unknown region by first finding nearby known structure elements. For example, from ends of known structural edges that abruptly terminate at the border of an unknown region, the inpainter applies the received edge information to propagate the edge as a mathematical construct or a 1-pixel-wide curve across the unknown region—so that the edge is made continuous with the neighboring regions and with a shape or path derived from the received edge information. The inpainter then applies a pixel classifier to label each pixel on or near the propagated edge as either a structure pixel, or as a pixel belonging to one of the objects on either side of the propagated edge (the edge inherently delineates two objects).

Then the inpainter fills in each pixel via an exemplary distance-based pair matching technique. For structure pixels, a given pixel is filled in with a value based on one of its neighboring pixels, depending on distance from the neighboring pixel and situational similarity between pixel pairs. For object pixels that are near the propagated structural edge within a distance threshold, a similar pair matching technique is used to fill in these object pixels except that the distance of each pixel in the pair from the structural edge is also taken into account in the calculations.

Once the propagated structure and nearby pixels have been filled in, a texture synthesizer completes each unknown region using texture appropriate for each object. Each object includes those pixels assigned to it by the pixel classifier.

The overall result of using the assistant edge information is a higher compression ratio than conventional techniques, especially for images that have some redundant visual structure, and a high perceptual fidelity to the original image.

Exemplary System

Figure 2:
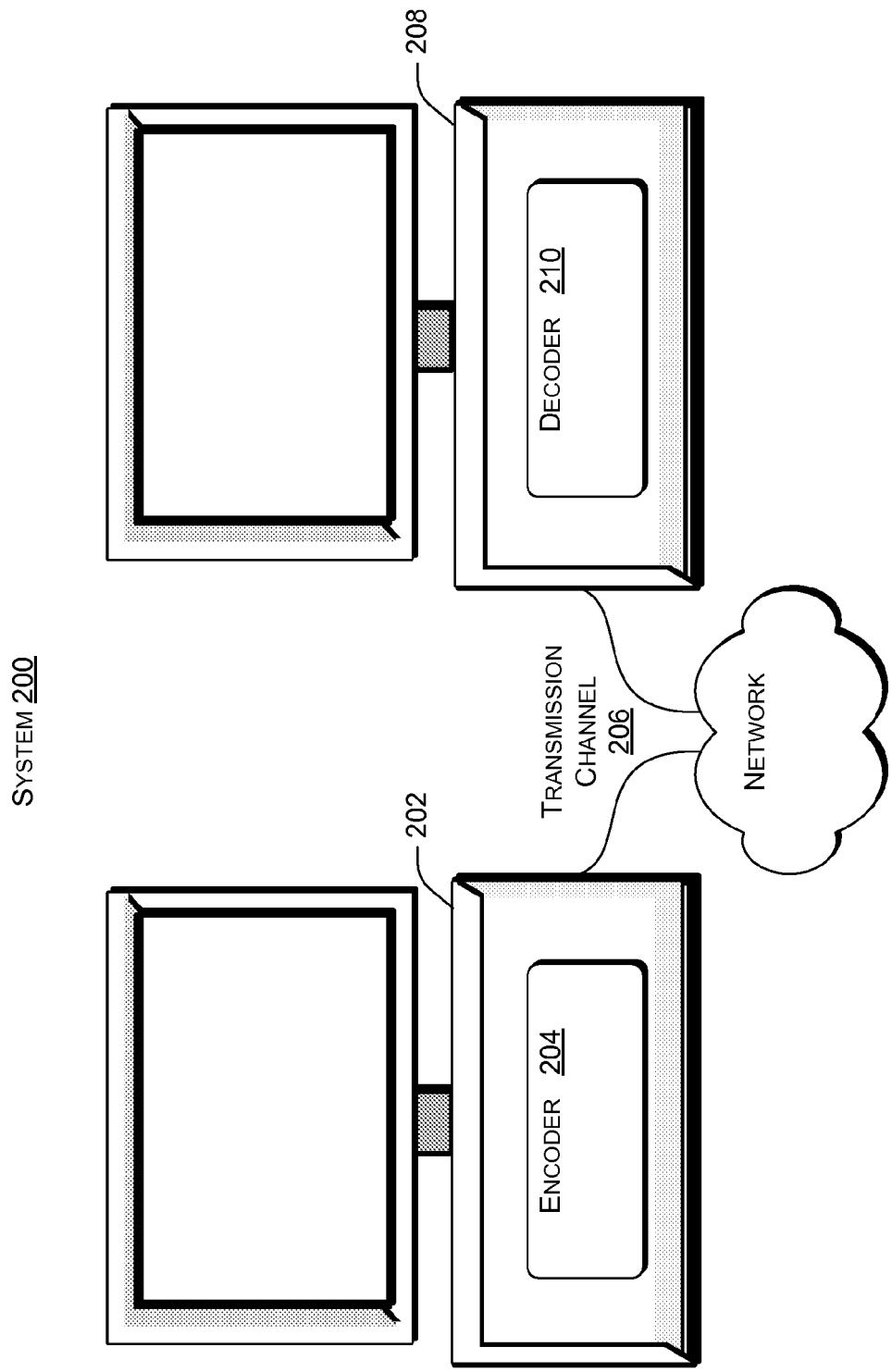
FIG. 2 is a diagram of an exemplary system for vision-based image compression.

FIG. 2 shows an exemplary system 200 for performing the exemplary vision-based image compression and structure-aware inpainting assisted by extracted edge information. A first computing device 202 hosts an image encoder 204. The first computing device 202 is coupled over a transmission channel 206, such as a network, to a second computing device 208. The second computing device 208 hosts an image decoder 210.

At the first computing device 202, the image encoder 204 encodes the image 100 (or a video). After transfer of the coded image over the transmission channel 206, e.g., as a bitstream, the image 100 is restored at the second computing device 208 by the image decoder 210. In a typical setup, each computing device may have both the image encoder 204 and the image decoder 210 in order to send coded images back and forth between computing devices.

Figure 3:
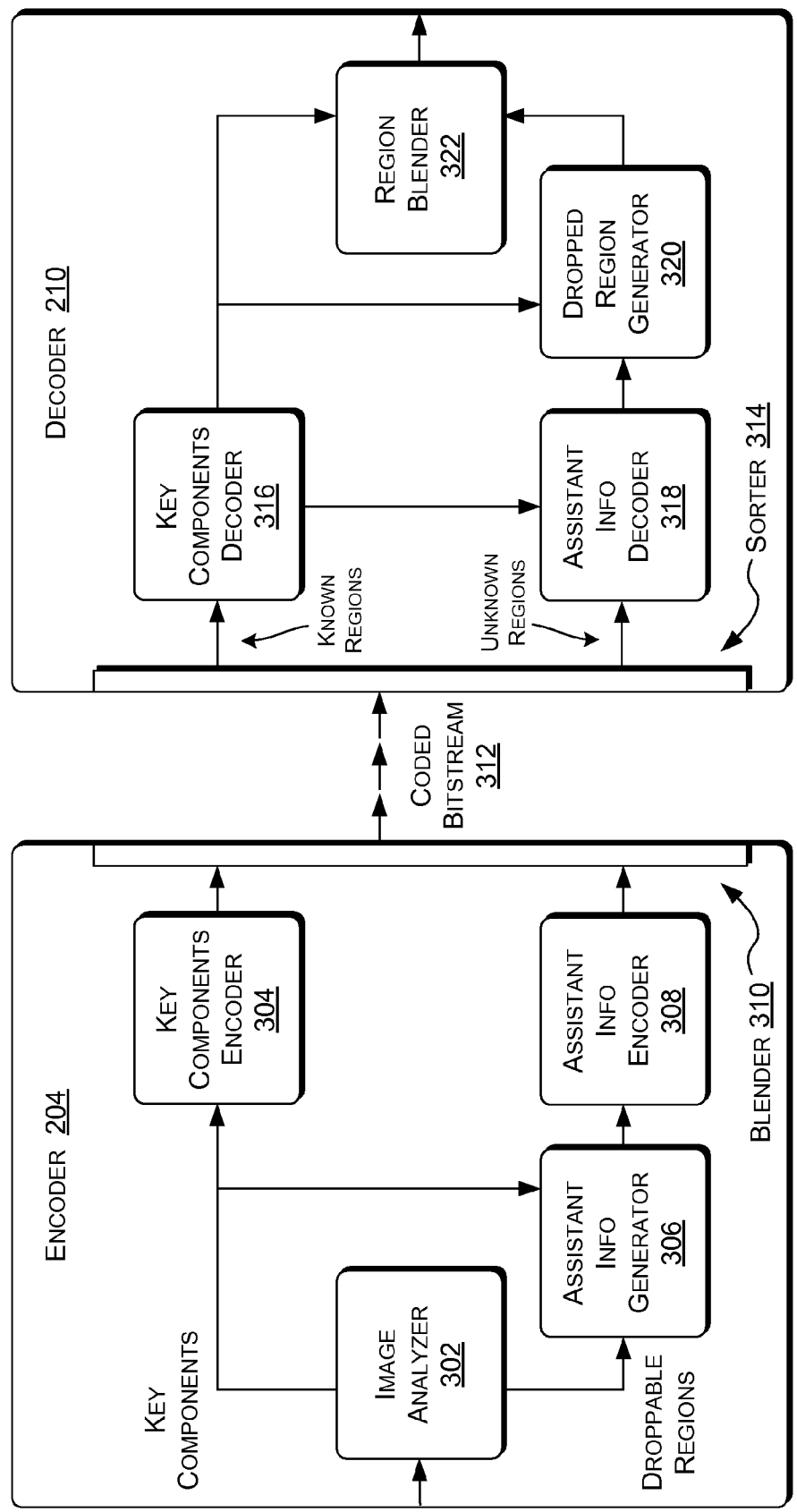
FIG. 3 is a block diagram of an exemplary encoder and decoder.

FIG. 3 shows the exemplary encoder 204 and decoder 210 of FIG. 2, in greater detail. The illustrated implementations of the encoder 204 and decoder 210 are only one example configuration, for descriptive purposes. Many other arrangements of the illustrated components or even different components constituting these components are possible within the scope of the subject matter. The exemplary encoder 204 and decoder 210 can be executed in hardware, software, or combinations of hardware, software, firmware, etc.

The encoder 204 includes an image analyzer 302, a key components encoder 304, an assistant information generator 306, an assistant information encoder 308, and a blender 310. The image analyzer 302 partitions the image 100 into regions that have key components (such as those regions in area 102 of FIG. 1) and remaining regions (such as those in area 104 of FIG. 1) that may contain significant amounts of structure. The key components encoder 304 can be one of the conventional signal-processing-based/transform-based compression techniques, such as a JPEG technique. The assistant information generator 306, to be described in greater detail below, extracts edge information from the regions of the image (such as in 104) that will be dropped or skipped at the compression stage, i.e., the regions that will not be subjected to the key components encoder 304. The assistant information encoder 308 compresses the extracted edge information—in place of the literal content of the regions that the edge information is extracted from. The blender 310 combines the compressed key component regions and the compressed edge information—the "assistant information"—into a single bitstream 312 for transfer.

The exemplary decoder 210 includes a sorter 314 to obtain the compressed key components and the compressed assistant information from the bitstream 312, a key components decoder 316, an assistant information decoder 318, a dropped region generator 320, and a region blender 322. The key components decoder 316 decompresses the conventionally compressed regions back into regions that contain key visual components. The assistant information decoder 318 decompresses the edge information. The dropped region generator 320, to be described in greater detail below, regenerates the dropped regions including propagating structural edges as guided by the decompressed edge information from the assistant information decoder 318. The region blender 322 integrates the decompressed key components and the regenerated or resynthesized dropped regions, to reconstitute the image 100.

Figure 4:
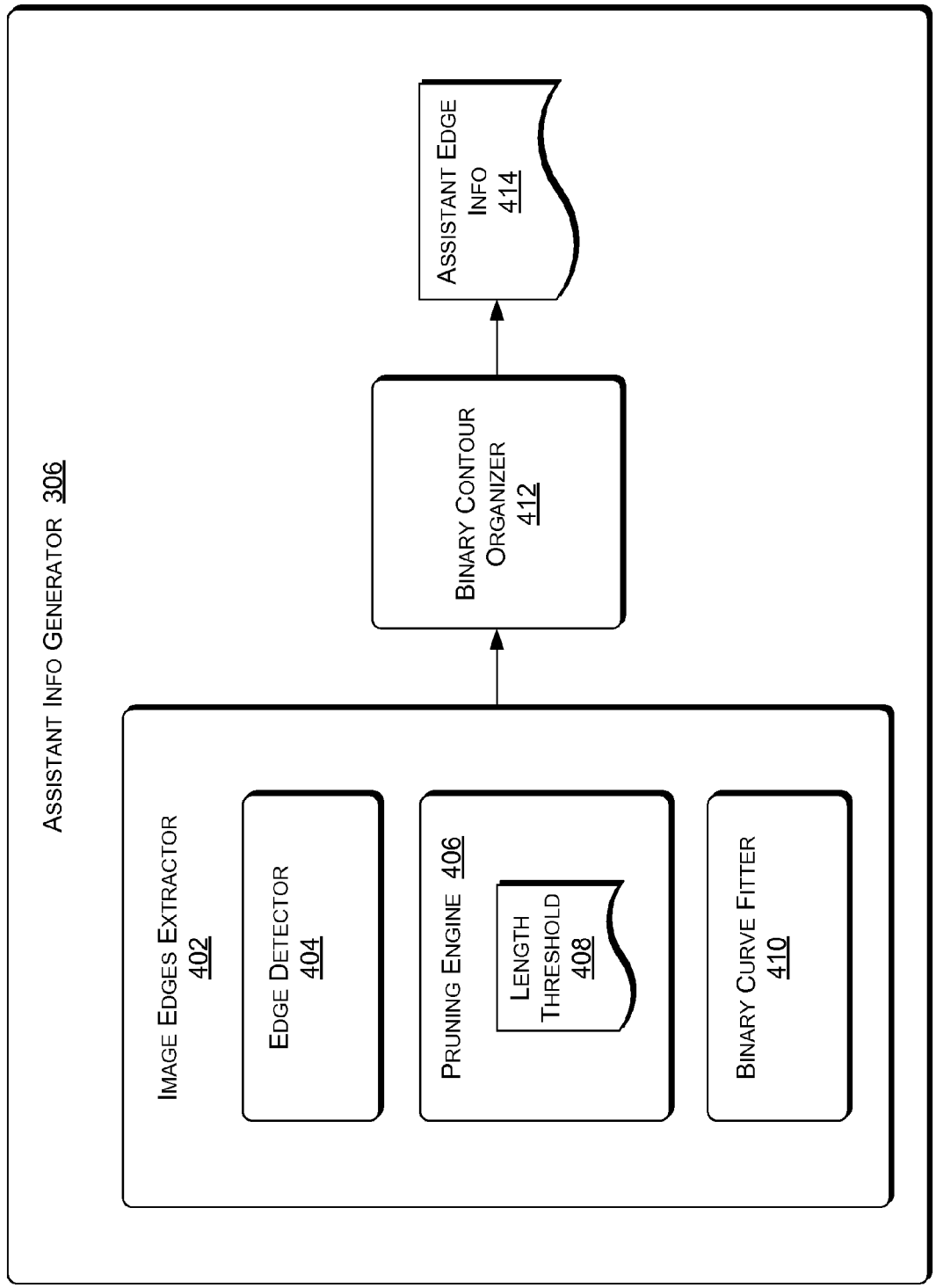
FIG. 4 is a block diagram of an exemplary assistant information generator of FIG. 3 in greater detail.

FIG. 4 shows the exemplary assistant information generator 306 of the encoder 204, in greater detail. The illustrated implementation is only one example configuration, for descriptive purposes. Other arrangements of the assistant information generator 306 even including different components are possible within the scope of the subject matter. Such an exemplary assistant information generator 306 can be executed in hardware, software, or combinations of hardware, software, firmware, etc.

The exemplary assistant information generator 306 includes an image edges extractor 402, which in turn includes an edge detector 404, a pruning engine 406 that may remove detected edges shorter than a length threshold 408, and a binary curve fitter 410. The assistant information generator 306 may also include a binary contour organizer 412 that produces the assistant edge information 414. The assistant information generator 306 will be described in greater detail further below under operation of the exemplary system 200.

Figure 5:
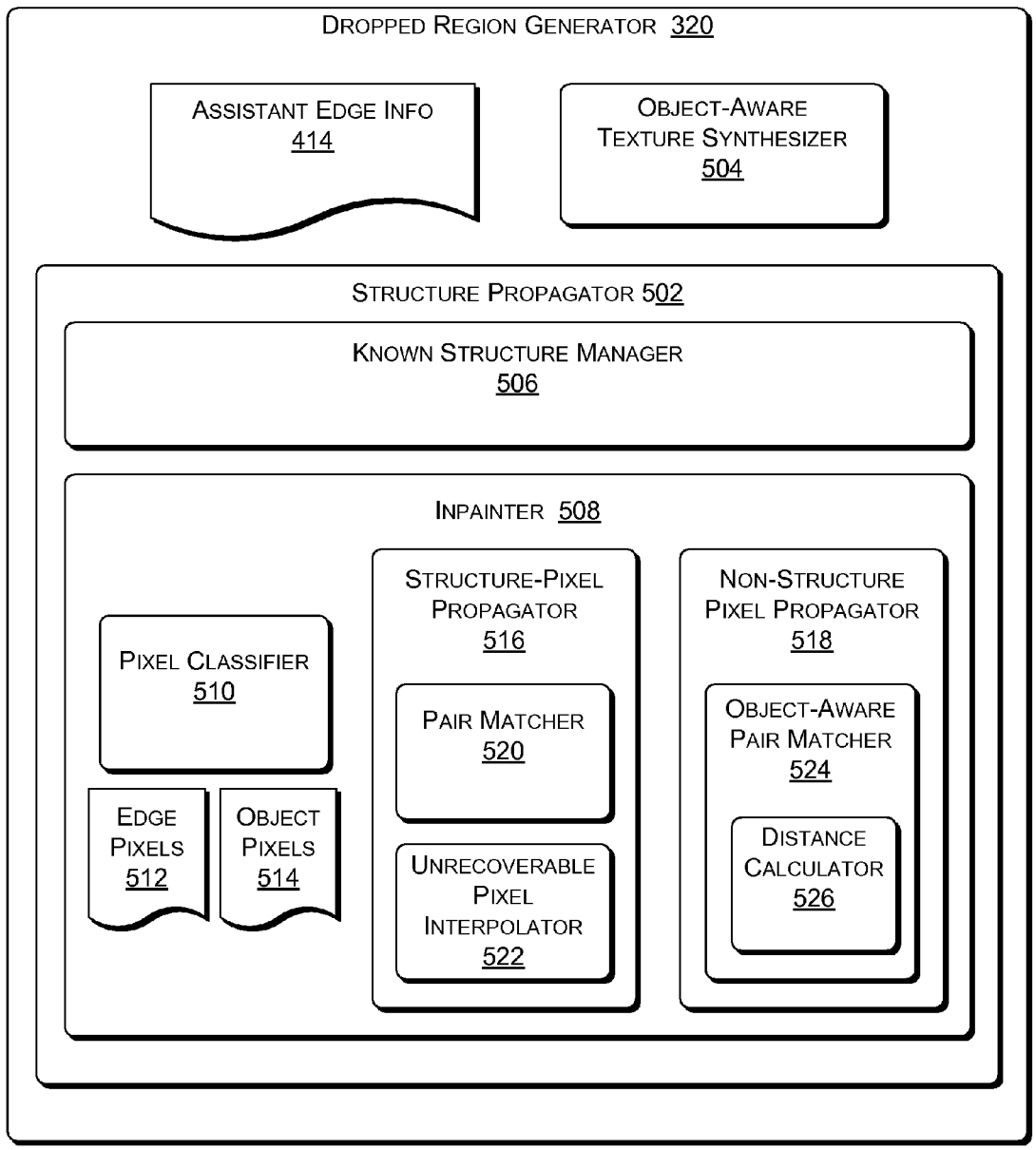
FIG. 5 is a block diagram of an exemplary dropped region generator of FIG. 3 in greater detail.

FIG. 5 shows the dropped region generator 320 of FIG. 3, in greater detail. The illustrated implementation is only one example configuration, for descriptive purposes. Other arrangements of the dropped region generator 320 containing variations in the components, are possible within the scope of the subject matter. Such an exemplary dropped region generator 320 can be executed in hardware, software, or combinations of hardware, software, firmware, etc.

The illustrated dropped region generator 320 receives the assistant edge information 414, e.g., in a bitstream 312, and invokes a structure propagator 502 to synthesize visual structure for the unknown regions to be regenerated from the assistant edge information 414. An object-aware texture synthesizer 504 in the dropped region generator 320 fleshes out each unknown region with object-appropriate textures once structural edges have been propagated and pixels in and around the structural edges have been filled in.

The structure propagator 502 may further include a known structure manager 506, and a (distance-based) inpainter 508. The inpainter 508, in turn, includes a pixel classifier 510 to assign pixels as edge pixels 512 or object pixel 514 (for example as pixels of "left" and "right" objects on either side of a propagated structural edge). The inpainter 508 also includes a "structure-pixel" propagator 516 and a "non-structure pixel" propagator 518. The structure-pixel propagator 516 fills in pixels in the edge being propagated via a pixel pair matcher 520 and may also include an unrecoverable pixel interpolator 522. The "non-structure pixel" propagator 518 includes an object-aware pixel pair matcher 524 and a distance calculator 526 to determine distances to the structural edge of each pixel used by the pair matcher 524.

Operation of the Exemplar Image Compression System

In the following description of operation, the key visual components are sometimes referred to as "known regions" of the image while droppable regions (regions to be skipped at the encoder's data compressor) are referred to as "unknown regions."

In broad terms, at the encoder 204, given some key visual components and some assistant edge information, regions that have the key components are coded conventionally and the assistant edge information 414 is organized as binary structure curve information and coded by binary arithmetic coding, for example.

At the decoder 210, the key components and the assistant edge information 414 are first sorted out of the bitstream 312 and decoded by respective decoders 316 and 318. Then, the inpainter 508 restores regions dropped from compression at the encoder 204. Finally, the region blender 322 integrates the restored dropped regions and the decompressed key components to reconstitute the entire image 100.

Structure-Aware Inpainting

There is a common assumption in conventional image inpainting that structure and texture information in unknown regions can be directly or indirectly derived from surrounding/neighboring known regions. But for more general cases, unknown regions may contain structure information that can hardly be inferred even by human intelligence. In typical conventional inpainting applications (e.g. deterioration and element recovery), no existing approaches can tackle this problem of resurrecting lost structural features on account of the lack of relevant information about the lost structure.

The significant difference between reviving a deteriorated image and exemplary image compression is that the entire image is available from the outset in the compression scenario. Hence, many types of assistant information can be extracted from the source image to guide and inform the inpainting. The assistant information itself can be further compressed.

The exemplary structure-aware inpainter 508 is distance-based in its pixel filling capacity, and solves at least two main issues: first, what should be extracted from the source image 100 as the assistant structure information 414? Second, how should unknown regions be synthesized given the assistant binary structure information 414 from the source image 100?

Extracting Structure

In one implementation, the image edges extractor 402 uses principles from computer vision science to represent visual structure as one-pixel-width binary curves. The assistant information encoder 308 can efficiently compress these, in turn, by arithmetic coding.

For the purpose of keeping semantic fidelity in unknown regions, the extracted structure information should be binary contours of objects. Thus, the local properties extracted by conventional edge detectors, such as the Sobel operator or the Laplacian operator, are not very helpful in this case. Still, there are many existing approaches for extracting topological structure from an image 100 that can be employed in the exemplary system 200 to assist with extracting the structure information.

There are small edge pieces and short branches generated by the edge detector 404, however, which do not belong to the type of desirable binary structure curves that are typically compatible with the exemplary inpainter 508. Thus, in one implementation, the pruning engine 406 discards edges shorter than a reasonable length threshold 408, and also removes short branches when connected to a main structure.

After the pruning engine 406 removes such non-structural edges, the resulting edge information is generally very friendly to the structure-aware inpainter 508.

Unknown Region Completion

Figure 6:
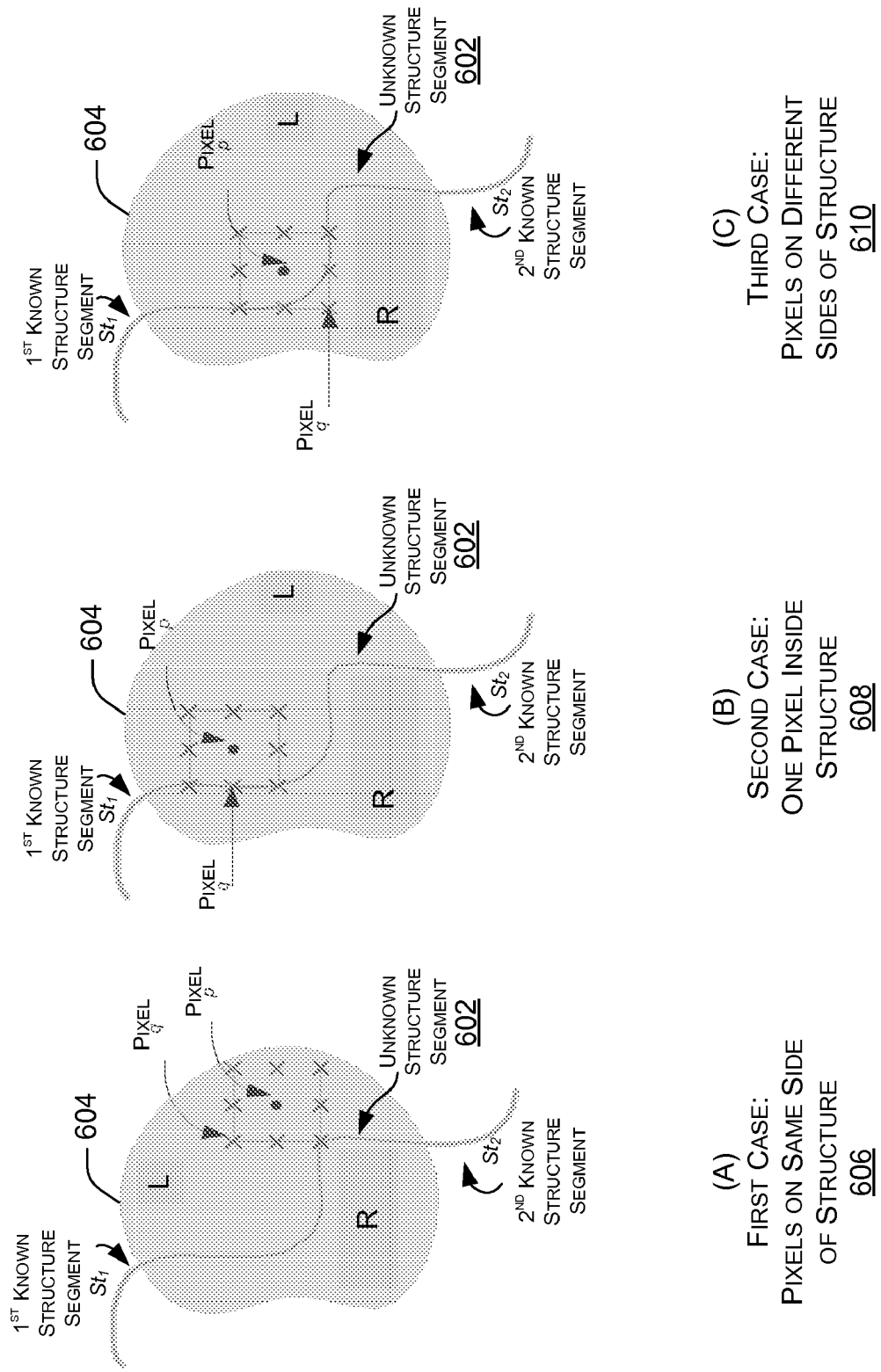
FIG. 6 is a diagram of exemplary structure propagation during structure-aware inpainting.

Referring to FIG. 6, (and to FIGS. 3, 4, and 5 for components), given the assistant edge information 414—i.e., the binary structure information—the inpainter 508 propagates the structure 602 along a path derived from the received structure information 414. Then, the remaining part of the unknown region 604 is restored by the texture synthesizer 504. For convenience and calculation, hereafter, the unknown and known regions are denoted by F' and F, respectively; while the structure information (in F' and F) are represented by St' and St, respectively.

In one implementation, the image edges extractor 402 extracts known structure (St) in a known region (F) is in the vicinity of unknown region F' 604 in order for the inpainter 508 to propagate the unknown structure St' 602 in unknown region F' 604. Since the image analyzer 302 of the encoder 204 has full control of unknown region selection, the known structure manager 506 in the decoder 210 can readily assume that at least one of the two known structures from nearby known regions (marked as $St_1$ and $St_2$ in FIG. 6) and connecting with unknown structure St' 602, can be found. Without loss of generality, the description will now focus on the circumstance in which known structures $St_1$ and $St_2$ are both available.

Pixel Classification

Since the pixels lying across the propagated structure 602 usually belong to different objects, the structure propagator 502 of the dropped region generator 320 can first classify the pixels in both nearby known region F and unknown region F' 604 into different objects according to the available structure information 414. As shown in FIG. 6, all pixels in known region F and unknown region F' 604 can be classified into three subsets, "L", "R", and "E". L is on the region's left of the propagated structure 602; R is on the right of the propagated structure 602; and E is within the propagated structure itself 602, where $E \pm St_1 \cup St_2 \cup St'$, according to the relative position of the pixels to the path defined by the structure information 414. In FIG. 6, L and R, then, represent the two objects separated by the propagated structure 602.

For one pixel $p \in F \cup F'$, the set of its 8-neighbors in a grid is denoted as N(p). Minimal (Euclidean) distance between pixels p and q in FIG. 6 is denoted as d(p, q). In one implementation, while arbitrarily assigning pixel $p_0$ to object L, the pixel classifier 510 processes each pixel as follows:

Case One 606: When $1 < D(p) \leq T$, if $\exists q \in N(p) \backslash E$ and $q \in L$(or R), then $p \in L$(or R), (as shown in 606 of FIG. 6(a));

Case Two 608: When D(p)=1, if $\exists q \in N(p) \backslash E$, d(p,q)=1 and $q \in L$(or R), then $p \in L$(or R), (as shown in 608 of FIG. 6(b));

Case Three 610: if $\exists q \in N(p) \backslash E$, d(p,q)>1 and $q \in L$(or R), then $p \in R$(or L) if $N(q) \cap N(p) \subset E$ (as shown in 610 of FIG. 6(c)).

Structure Propagation

After the pixel classifier 510 labels the pixels, the "structure-pixel" propagator 516 restores pixels inside the structure 602 and then the "non-structure pixel" propagator 518 fills in the pixels near the propagated structure 602. Without loss of generality, the structure information 414 can be described as directional, such as from $St_1$ to $St_2$ (as shown in FIG. 6).

The pair matcher 520 fills in pixels inside the structure 602. For example, consider the following scenario. $x_1$ and $x_2$ are two pixels in a known region, $X_3$ is a pixel with available information (the pixel is known or has been filled already), and $X_4$ is the unknown pixel to be generated by the pair matcher 520. The pair matcher 520 formulates the pair matching function as in Equation (1):

$$x_1 - x_2 = x_3 - x_4, \text{ if } d(x_1, x_2) = (x_3, x_4) \text{ and } \text{sim}(x_1, x_3) = \text{TRUE}. \quad (1)$$

In Equation (1), the form d(x, y) is the distance between x and y inside the structure 602, and sim(x, y) represents the similarity between x and y.

In greater detail, referring again to FIG. 6, assume that p is the current unknown structure pixel being recovered, q is a known pixel inside the structure 602 and the distance between q and p (d(p, q)) is 1. A known pixel p' in the structure 602 is selected as a candidate for filling-in p, if there is a known pixel q' in the structure 602 that is equal to q, and the distance between q' and p' is 1. In other words, a known relationship between a first pair of pixels in the structure 602 can be propagated to a second pair of pixels in the structure 602, if one of the members of the second pair is similar to its corresponding member in the first pair.

There may be more than one candidate pixel in the structure 602 when applying the exemplary pair matching. The pair matcher 520 arbitrarily selects one of the candidates to recover the pixel p. Otherwise, if there is no candidate available at distance of 1, the structure-pixel propagator 516 checks for candidate pixels at larger distances until the largest distance is considered. In the event that the unknown pixel p is filled, it is marked as an available pixel and can then be used as a candidate pixel, rather than a known pixel.

In addition, it is possible that some unknown pixels cannot be recovered by the pair matcher 520. Then the unrecoverable pixel interpolator 522 applies a distance-based interpolation to fill in such pixels. In such a case, an unknown pixel p in the structure 602 is restored according to Equation (2):

$$p = \frac{d(p, b) \times a + d(a, p) \times b}{d(a, p) + d(p, b)}, \quad (2)$$

where d(x, y) is the distance from x to y along the structure 602, and a and b are two known pixels in the structure 602 that have minimal distances from p in different directions. If only one known pixel is available, then p is set directly to the known one.

Second, the pixels near the structure 602 are processed by the non-structure pixel propagator 518. During pixel classification, the pixel classifier 510 divides all pixels in known and unknown regions into object L and object R according to their relative position to the structural edge 602 derived from the structure information 414. Pair matching is performed to fill in the pixels of the two objects separately.

The minimal distance from pixel x to the structure 602 is denoted as D(x). The pixel p that is considered near to the structure 602 should satisfy D(p)≦R, where R is a threshold to limit the pair-matching area. The restoration of the pixels close to the structure 602 is very similar to the pair matching process inside the structure 602, except that the distance calculator 526 considers the relevant distance to the structure 602. That is, the distance d(x, y) in Equations (1) and (2) is replaced by D(x, y), as indicated in Equation (3):

$$D(x, y) = \{d(x, y), D(x) - D(y)\}. \quad (3)$$

Texture Synthesis

After structure propagation, the object-aware texture synthesizer 504 recovers the texture dropped from the unknown regions 604 by the encoder 204. Patch-based inpainting techniques can be readily applied to restore the missing textures. At this point, the known and unknown regions 604 have been partitioned into multiple objects by the pixel classifier 510. The texture synthesizer 504 applies a texture that is already associated with each object from known regions. A candidate patch of texture to be propagated over unfilled parts of an unknown region 604 is selected only from patches of texture in the same object.

Exemplary Methods

Figure 7:
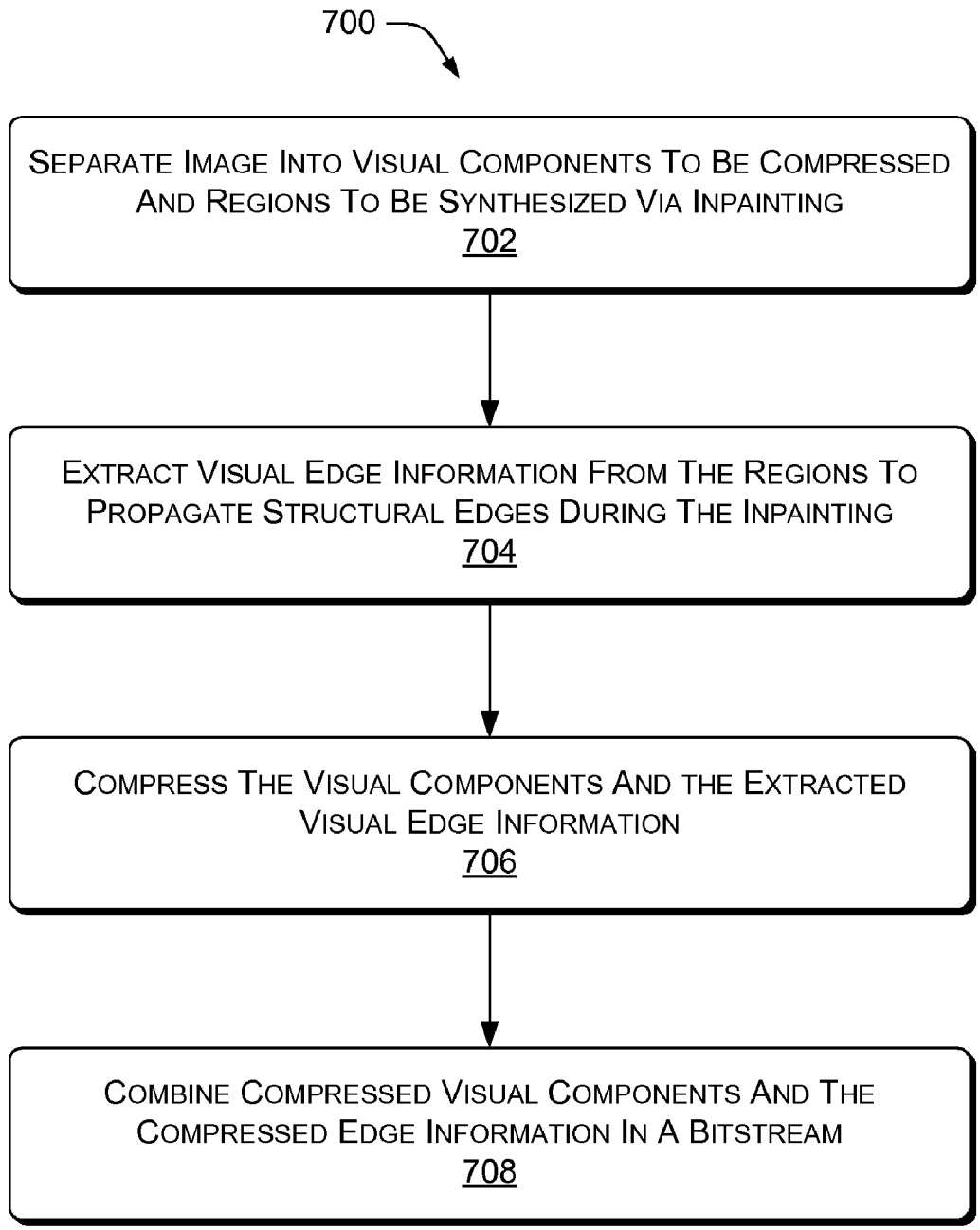
FIG. 7 is a flow diagram of an exemplary method of vision-based compression.

FIG. 7 shows an exemplary method 700 of vision-based image compression. In the flow diagram, the operations are summarized in individual blocks. The exemplary method 700 may be performed by hardware, software, or combinations of hardware, software, firmware, etch, for example, by components of the exemplary vision-based compression system 200.

At block 702, an image is separated into visual components to be compressed and remaining regions to be synthesized via inpainting at a decoder. The visual components to be compressed can be those key visual components of an image that are not worth the processing effort to try to summarize with assistant information and synthesize at the decoder via inpainting. Visual components that are too complex to synthesize or approximate at the decoder are best left to conventional compression. A given implementation of the method 700 may partition an image into equal blocks and then decide which blocks should be subjected to conventional compression, or the method 700 may segment the key visual components out of the image for conventional compression and subject the remaining "background" regions to synthesis via the assisted inpainting.

At block 704, visual edge information is extracted from the regions to be synthesized in order to propagate the edges back into the regions during their regeneration through inpainting. An elegant way to capture the visual edge information in the image regions is to detect the structural edges and then to summarize or approximate the edges by applying binary curve fitting. The detected edges can be modified somewhat by pruning to make the binary curve information more palatable to structure-aware inpainting. The assistant binary curve information can be organized by region or by coordinates, etc., before being transferred to the decoder.

At block 706, the visual components and the extracted visual edge information is compressed. The visual components are subject to conventional image compression while the edge information can be compressed by a different technique, such as binary arithmetic compression.

At block 708, the compressed visual components and the compressed edge information are combined into a bitstream. The bitstream may be transferred to a decoder or converted/stored as a data file to be retrieved and decoded later.

Figure 8:
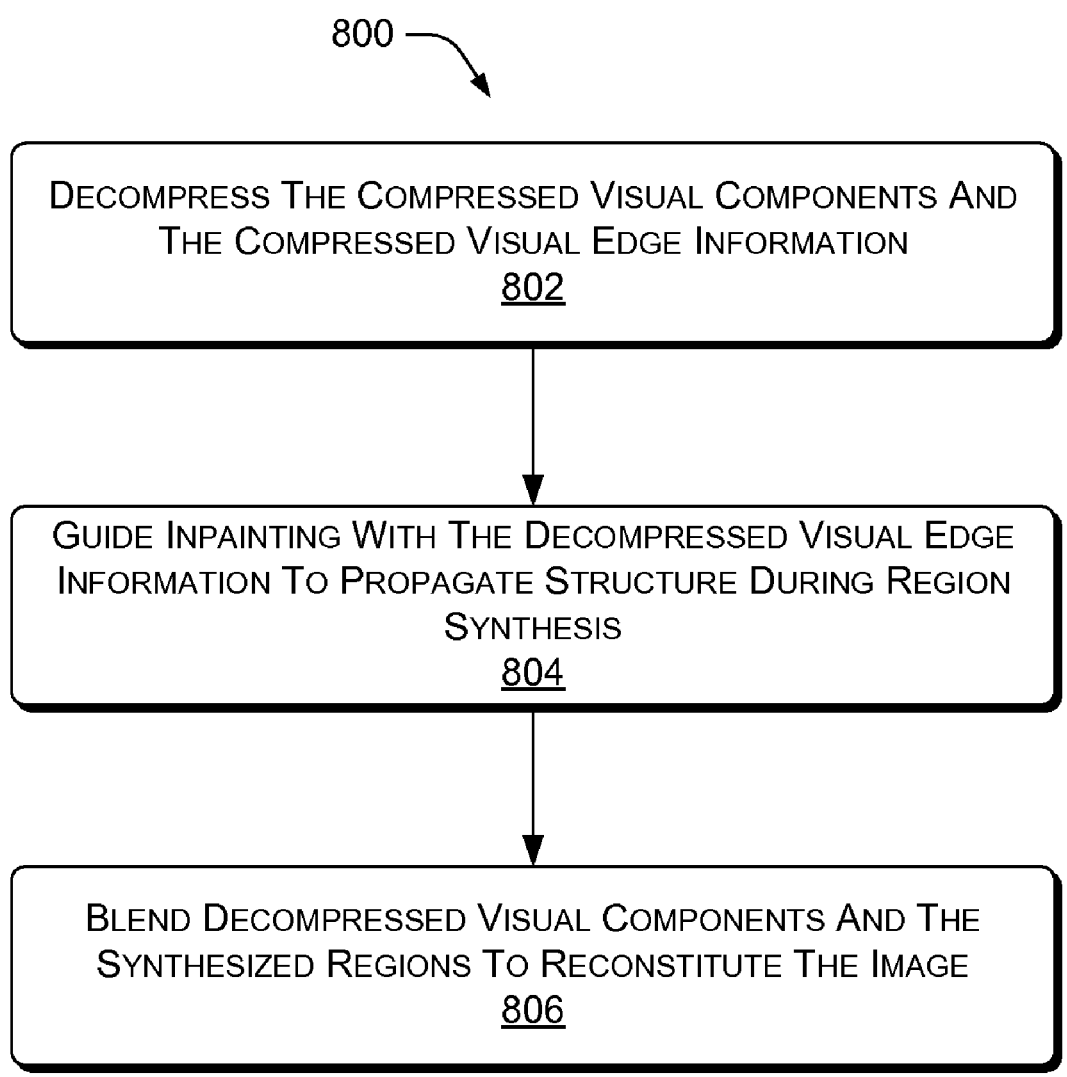
FIG. 8 is a flow diagram of an exemplary method of regenerating an image subjected to vision-based compression.

FIG. 8 shows an exemplary method 800 of regenerating an image that has been subjected to vision-based compression. In the flow diagram, the operations are summarized in individual blocks. The exemplary method 800 may be performed by hardware, software, or combinations of hardware, software, firmware, etc., for example, by components of the exemplary vision-based compression system 200.

At block 802, the compressed visual components and the compressed edge information are decompressed by techniques corresponding to the methods of their compression. If the compressed data is received as a bitstream then the components of the bitstream are first sorted out.

At block 804, the inpainting is guided by the decompressed edge information in order to propagate structure during region synthesis. In an unknown region being regenerated through inpainting synthesis, the assistant edge information is first used to classify pixels as either structural edge pixels, object pixels to the left of the structural edge pixels, or object pixels to the right of the structural edge pixels. Then pixels are filled in by pair matching. A "model" pixel pair is found within a distance of each pixel to be recovered. The pixel being recovered can take on the value its corresponding mate in the other pair if the other partners in the pair also match. In other words, four pixels may have a proportional relationship in which information can be "cross-multiplied" to solve for an unknown pixel if the pixel pairs meet the similarity conditions. For example, in the pairs R:G/R:x, where x is the unknown pixel, x=G if conditions are correct. Non-structure pixels are also filled in a similar manner, except that distance form the structural edge is taken into account to limit the area from which candidate pixel pairs can be drawn.

At block 806, the decompressed visual components and the regions synthesized by inpainting are blended into a regenerated image. That is, the decompressed visual components and the rest of the image that has been synthesized using the assistant structural edge information are combined back into a reconstituted version of the original image.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   separating an image into first regions to be compressed and second regions to be synthesized via inpainting;
   extracting visual edge information from the second regions, the visual edge information to be used for propagating structural edges of the second regions during the inpainting;
   compressing the first regions and the visual edge information; and
   combining the compressed first regions and the compressed visual edge information into a bitstream.

2. The method as recited in claim 1, wherein compressing the first regions includes coding the first regions via a transform-based image coding technique.

3. The method as recited in claim 1, wherein extracting the visual edge information includes detecting edges in the image and representing the edges as binary curves.

4. The method as recited in claim 3, wherein compressing the visual edge information includes coding the binary curves via binary arithmetic coding.

5. The method as recited in claim 1, wherein extracting the visual edge information includes detecting edges and pruning edges that are below a length threshold.

6. The method as recited in claim 1, wherein extracting the visual edge information includes detecting visual edges that represent a main visual structure in the image and pruning short edges attached to the main visual structure when the short edges are below a threshold of length.

7. The method as recited in claim 1, further comprising:
   receiving the bitstream;
   decompressing the compressed first regions;
   decompressing the compressed visual edge information;
   guiding the inpainting with the decompressed visual edge information to propagate the structural edges during synthesizing the second regions; and
   blending the decompressed first regions and the restored second regions to regenerate the image.

8. The method as recited in claim 7, wherein guiding the inpainting includes propagating a known structure beginning at a border of an adjacent known region into a current unknown region using the decompressed visual edge information.

9. The method as recited in claim 7, wherein guiding the inpainting includes classifying pixels either as structure pixels or as object pixels that are near the structure pixels.

10. The method as recited in claim 9, further comprising restoring the structure pixels first and then restoring object pixels near the structure pixels.

11. The method as recited in claim 10, wherein restoring the structure pixels includes pair matching based on a distance and a similarity between pairs of pixels, wherein a known relationship between a first pair of known pixels in the structure is propagated to a second pair of pixels in the structure when one of the pixels of the second pair is similar to a corresponding member of the first pair.

12. The method as recited in claims 10, wherein restoring the object pixels includes the pair matching, wherein the pair matching is performed with respect to a distance of each pixel pair from the structure.

13. The method as recited in claim 10, further comprising, when one of the structure pixels or object pixels is unrecoverable, applying a distance-based interpolation to fill in the unrecoverable pixel.

14. The method as recited in claim 7, further comprising synthesizing textures for inpainting remaining parts of the second regions, wherein the synthesizing includes creating respective textures for different objects on different sides of each structural edge, and wherein each model texture patch for synthesizing texture for an object is derived from the object being textured.

15. An image compression system, comprising:
   an encoder, including:
   an image analyzer to partition the image into visually important regions and remaining regions;
   an edge extractor to gather edge information from the remaining regions;
   at least one compressor to compress the visually important regions and to compress the edge information of the remaining regions; and
   a blender to combine the compressed visually important regions and the compressed edge information into a bitstream.

16. The image compression system as recited in claim 15, wherein the edge extractor detects visual edges in the remaining regions and represents the visual edges as binary curves.

17. The image compression system as recited in claim 15, further comprising:
   a decoder to receive the bitstream, including:
   a first decompressor to restore the visually important regions;
   a second decompressor to restore the edge information;
   a region generator to synthesize the remaining regions; and
   a structure-aware inpainter in the region generator to propagate structure according to the edge information.

18. The image compression system as recited in claim 17, wherein the structure-aware inpainter includes:
   a pixel classifier to designate pixels as structure pixels or as object pixels belonging to first and second objects on either side of the structure pixels;

a pair matcher to fill in structure pixels by propagating a known relationship between a first pair of known pixels in the structure to a second pair of pixels in the structure when one of the pixels of the second pair is similar to a corresponding member of the first pair, and to fill in object pixels near the structure pixels by propagating a known relationship between a first pair of known pixels to a second pair of pixels when one of the pixels of the second pair is similar to a corresponding member of the first pair, applied with respect to distances of the pixels from a structural edge;

and further comprising:

a texture synthesizer to fill in remaining pixels of each remaining region with a texture consistent with textures of the object to which the pixel classifier classified each pixel; and a region blender to blend the decompressed visually important regions and the synthesized remaining regions, to regenerate the image.

* * * * *